United States Patent
Vayanos et al.

(10) Patent No.: US 7,283,500 B2
(45) Date of Patent: **\*Oct. 16, 2007**

(54) METHOD AND APPARATUS FOR ALLOCATING DATA STREAMS ONTO A SINGLE CHANNEL

(75) Inventors: Alkinoos Hector Vayanos, San Diego, CA (US); Francesco Grilli, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/040,857

(22) Filed: Jan. 21, 2005

(65) Prior Publication Data

US 2005/0128986 A1    Jun. 16, 2005

Related U.S. Application Data

(63) Continuation of application No. 09/713,696, filed on Nov. 15, 2000, now Pat. No. 6,847,623.

(51) Int. Cl.
*H04B 7/216* (2006.01)

(52) U.S. Cl. .................. 370/335; 370/342; 370/537
(58) Field of Classification Search .................. None
See application file for complete search history.

(56) References Cited

U.S. PATENT DOCUMENTS

| 6,636,497 B1 * | 10/2003 | Honkasalo et al. ......... 370/335 |
| 6,813,284 B2 * | 11/2004 | Vayanos et al. ............ 370/537 |
| 2002/0054578 A1 * | 5/2002 | Zhang et al. ............... 370/328 |

\* cited by examiner

*Primary Examiner*—Duc Ho
(74) *Attorney, Agent, or Firm*—Thomas R. Rouse; Charles D. Brown; Jian Ma

(57) ABSTRACT

A method and system that enables multiplexing a plurality of data streams onto one data stream based on data stream priorities and available transport frame combinations (TFCs) is disclosed. A mobile station has applications that produce separate data streams. Example applications include voice, signaling, E-mail and web applications. The data streams are combined by a multiplexer module into one data stream called the transport stream. The transport stream is sent over the reverse link to base station transceivers (BTS). The multiplexer module multiplexes the data streams onto the transport stream according to their priorities and the available TFCs.

12 Claims, 7 Drawing Sheets

METHOD AND APPARATUS FOR ALLOCATING DATA STREAMS ONTO A SINGLE CHANNEL

CLAIM OF PRIORITY UNDER 35 U.S.C. §120

The present Application for Patent is a Continuation of patent application Ser. No. 09/713,696 entitled "Method and Apparatus for Allocating Data Streams Onto a Single Channel" filed Nov. 15, 2000, now U.S. Pat. No. 6,847,623, and assigned to the assignee hereof and hereby expressly incorporated by reference herein.

BACKGROUND

I. FELD

The present invention pertains generally to the field of communications and more specifically to a novel and improved system and method for allocating a plurality of data streams onto a single channel.

II. BACKGROUND

A remote station is located within a network. The remote station includes applications that produce logical data streams. The remote station allocates the logical data streams onto a single transport stream. A technique for multiplexing data from logical data streams onto a transport stream is disclosed in U.S. application Ser. No. 09/612,825, filed Feb. 8, 1999, entitled "METHOD AND APPARATUS FOR PROPORTIONATELY MULTIPLEXING DATA STREAMS ONTO ONE DATA STREAM," now allowed, which is assigned to the assignee of the present invention and incorporated by reference herein.

Choosing an allocation scheme for allocating bits from multiple data streams onto a single channel is difficult because a number of factors have to be taken into consideration. One factor that has to be considered is the priority of each data stream. Higher priority data streams take precedence over lower priority data streams. Another factor that has to be considered is the type of transport format combinations (TFCs) that are allowed. A TFC is a combination of transport frames to be sent out on a wireless link of the remote station at each time slot. A transport format has a number of blocks (i.e. one or more blocks) and a block size. An allocation scheme that takes into consideration the priority of data streams and the TFCs available is desired.

It is also desirable to have an allocation scheme that selects TFCs without having to pad the TFCs, which wastes valuable space. In addition, throughput is improved when TFC do not have to be padded because the TFCs that are transmitted over the transport channel are full. Some allocation schemes pad TFCs. In these padded allocation schemes, a TFC is padded when the TFC is not completely filled with bits from the logical data streams.

SUMMARY

The presently disclosed method and apparatus are directed to allocating a plurality of data streams onto one data stream for transmission. A list of allowable TFCs is received from a network. Bits from data streams at a logical level are placed into TFCs at a transport level based on the priority of the data streams and the TFCs available.

In one aspect, a plurality of applications provides a plurality of data streams to be allocated to a single stream. In another aspect, subcriber units provide a plurality of data streams to be allocated to a single stream of a base station. In still another embodiment, a plurality of base stations provides a plurality of data streams to be multiplexed by a multiplexer within a base station controller.

In one aspect, a subscriber unit comprises a memory, a plurality of applications residing in the memory, each application producing a data stream wherein each data stream comprises at least one bit, and a multiplexer configured to receive each data stream and uniformly distribute bits from the plurality of data streams onto a single data stream.

In one aspect, the multiplexer is configured to receive each data stream and uniformly distribute bits from the plurality of data streams onto a single data stream based on the proportion value.

In another aspect, a multiplexer is configured to receive each of a plurality of data streams and uniformly distribute bits from the plurality of data streams onto a single data stream based primarily on the data streams' proportion value and secondarily on the data streams' priority.

In still another aspect, a wireless communication system comprises a subscriber unit, a base station coupled to the subscriber unit, and a base station controller coupled to the base station. The subscriber unit includes a plurality of applications and a multiplexer, wherein each application produces a data stream as input to the multiplexer and each data stream comprises at least one bit. The multiplexer distributes bits from the data streams onto a single stream based on allowable TFCs not requiring padding.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
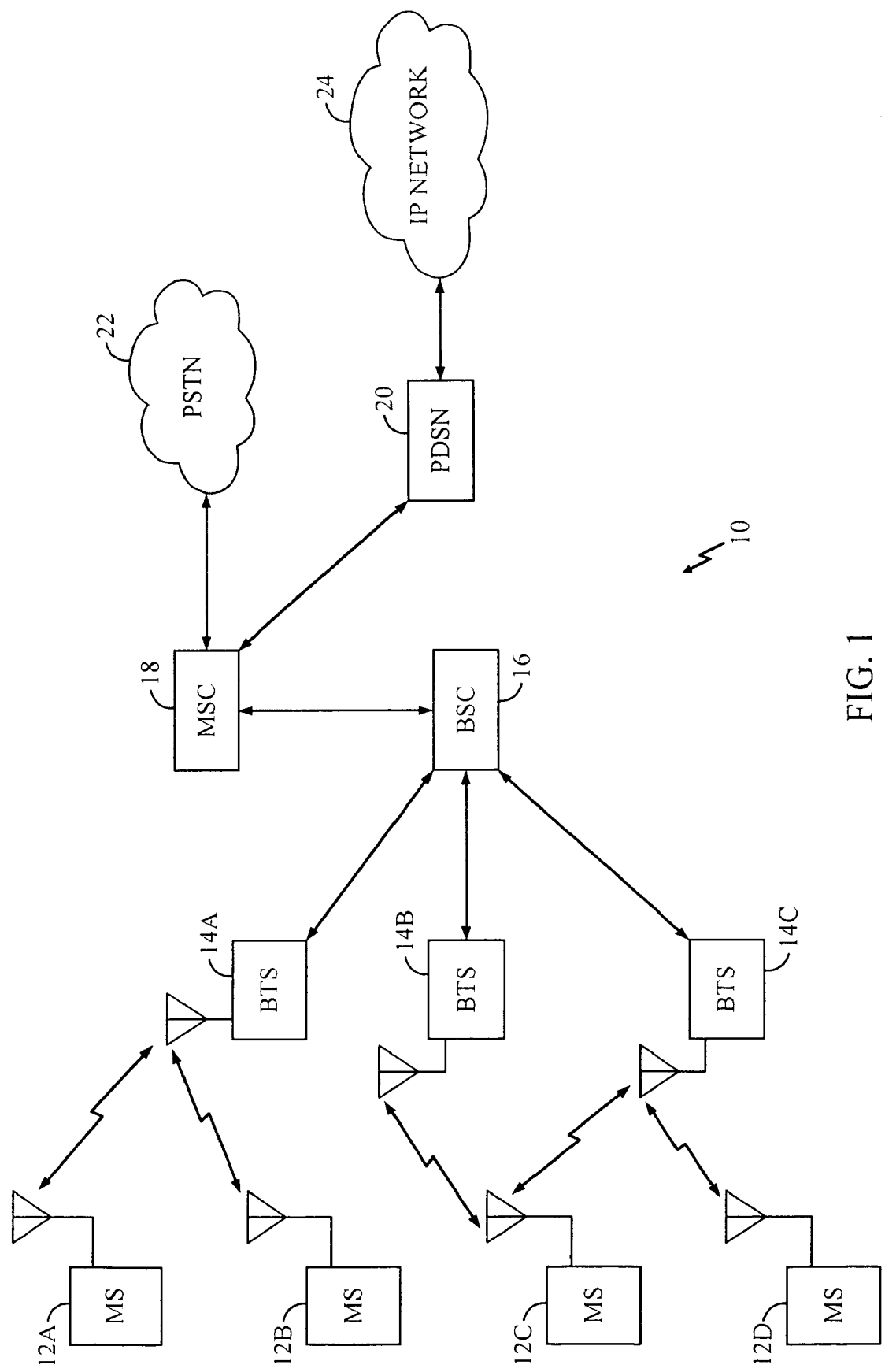
FIG. 1 is a schematic overview of an exemplary cellular telephone system.

An exemplary cellular mobile telephone system in which the present invention is embodied is illustrated in FIG. 1. For purposes of example the exemplary embodiment is described herein within the context of a W-CDMA cellular communications system. However, it should be understood that the invention is applicable to other types of communication systems, such as personal communication systems (PCS), wireless local loop, private branch exchange (PBX), or other known systems. Furthermore, systems utilizing other well known multiple access schemes such as TDMA and FDMA as well as other spread spectrum systems may employ the presently disclosed method and apparatus.

As illustrated in FIG. 1, a wireless communication network 10 generally includes a plurality of mobile stations (also called mobiles, subscriber units, remote station, or user equipment) 12a-12d, a plurality of base stations (also called base station transceivers (BTSs) or Node B), 14a-14c, a base station controller (BSC) (also called radio network controller or packet control function 16), a mobile station controller (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with an associated hands-free car kit, a personal digital assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may advantageously be configured to perform one or more wireless packet data protocols such as described in, for example, the EIA/TAI/IS-707 standard. In a particular embodiment, the mobile stations 12a-12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In one embodiment, the mobile stations 12a-12d communicate with the base stations 14a-14c over an RF interface defined in the 3rd Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999) (hereinafter "cdma 2000"), which is fully incorporated herein by reference.

During typical operation of the wireless communication network 10, the base stations 14a-14c receive and demodulate sets of reverse-link signals from various mobile stations 12a-12d engaged in telephone calls, Web browsing, or other data communications. Each reverse-link signal received by a given base station 14a-14c is processed within that base station 14a-14c. Each base station 14a-14c may communicate with a plurality of mobile stations 12a-14d by modulating and transmitting sets of forward-link signals to the mobile stations 12a-12d. For example, as shown in FIG. 1, the base station 14a communicates with first and second mobile stations 12a, 12b simultaneously, and the base station 14c communicates with third and fourth mobile stations 12c, 14d simultaneously. The resulting packets are forwarded to the BSC 16, which provides call resource allocation and mobility management functionality including the orchestration of soft handoffs of a call for a particular mobile station 12a-14d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

The wireless communication channel through which information signals travel from a mobile station 12 to a base station 14 is known as a reverse link. The wireless communication channel through which information signals travel from a base station 14 to a mobile station 12 is known as a forward link.

CDMA systems are typically designed to conform to one or more standards. Such standards include the "TIA/EIA/IAS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, 3G TS 25.311 and 3G TS 25.214 (the W-CDMA standard), the "TR-45.5 Physical Layer Standard for cdma2000 Spread Spectrum Systems" (the cdma2000 standard), and the "TIA/EIA/IS-856 cdma2000 High Rate Packet Data Air Interface Specification" (the HDR standard). New CDMA standards are continually proposed and adopted for use. These CDMA standards are incorporated herein by reference.

More information concerning a code division multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both of which are assigned to the assignee of the present invention, and are incorporated in their entirety by reference herein.

Cdma 2000 is compatible with IS-95 systems in many ways. For example, in both the cdma2000 and IS-95 systems, each base station time-synchronizes its operation with other base stations in the system. Typically, the base stations synchronize operation to a universal time reference such as Global Positioning System (GPS) signaling; however, other mechanisms can be used. Based upon the synchronizing time reference, each base station in a given geographical area is assigned a sequence offset of a common pseudo noise (PN) pilot sequence. For example, according to IS-95, a PN sequence having 215 chips and repeating every 26.67 milliseconds (ms) is transmitted as a pilot signal by each base station. The pilot PN sequence is transmitted by each base station at one of 512 possible PN sequence offsets. Each base station transmits the pilot signal continually, which enables mobile stations to identify the base station's transmissions as well as for other functions.

In an exemplary embodiment, a mobile station communicates with a base station using wideband code division multiple access (W-CDMA) techniques. The base stations in a W-CDMA system operate asynchronously. That is, the W-CDMA base stations do not all share a common universal time reference. Different base stations are not time-aligned. Thus, although a W-CDMA base station has a pilot signal, a W-CDMA base station may not be identified by its pilot signal offset alone. Once the system time of one base station is determined, it cannot be used to estimate the system time of a neighboring base station. For this reason, a mobile station in a W-CDMA system use a three-step PERCH acquisition procedure to synchronize with each base station in the system. Each step in the acquisition procedure identifies a different code within a frame structure called a PERCH channel.

In an exemplary embodiment, a mobile station has a plurality of applications. The applications reside within the mobile station and each application produces a separate data stream. An application may produce more than one data stream.

Figure 2:
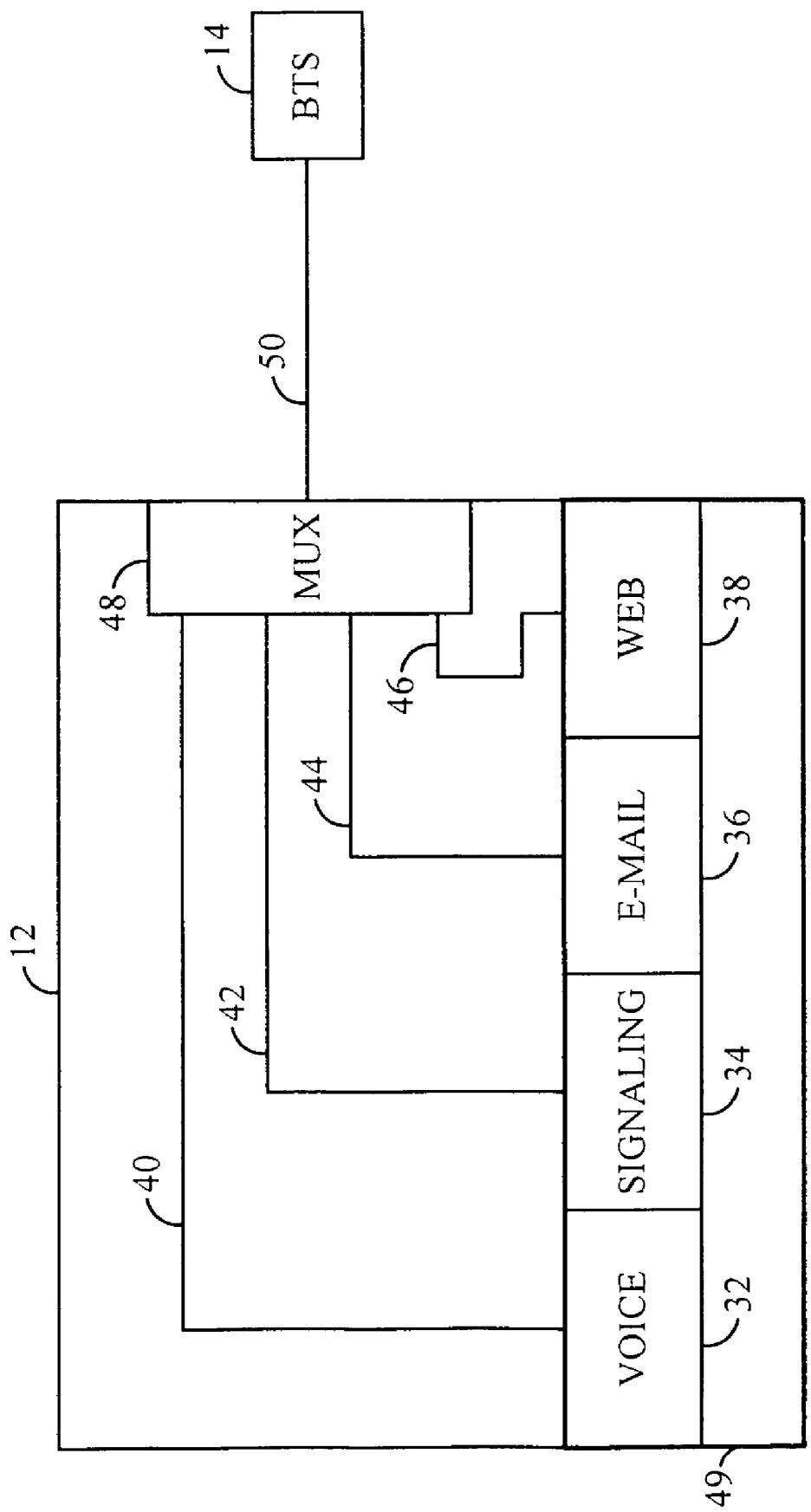
FIG. 2 shows a block diagram of a mobile station and a base station in accordance with an embodiment.

FIG. 2 shows a block diagram of a mobile station 12 and a base station 14 in accordance with an exemplary embodiment. The mobile station 12 includes voice 32, signaling 34, E-mail 36 and web applications 38 residing in the memory 49 of the mobile station 12. Each application, voice 32, signalling 34, E-mail 36 and web application 38 produces a separate data stream 40, 42, 44, 46, respectively. The data streams are multiplexed by a multiplexer module 48 into one data stream called the transport stream 50. The transport stream 50 is sent over the reverse link to a base transceiver station 14 (BTS), also called a base station for short.

Each data stream 40-46 has a priority. The multiplexer module 48 places bits from data streams at a logical level into TFCs at the transport level based on the priority of the data streams and the TFCs available without having to pad the TFCs. Other systems pad TFCs that are not filled with bits from the data streams. However, embodiments of the present invention do not pad the TFCs.

In an exemplary embodiment, the multiplexer module 48 operates within the media-access control (MAC) layer and gets the data stream priorities from a higher network layer. The MAC layer defines the procedures used to receive and transmit over the physical layer.

As would be apparent to one of ordinary skill in the art, the data streams 40-46 can be prioritized with any priority scheme known in the art, such as first-in-first-out (FIFO), last-in-first-out (LIFO), and shortest-job-first (SJF). As would be apparent to one of ordinary skill in the art, the multiplexer module 48 can operate on a plurality of network levels.

In another embodiment, the multiplexer module 48 is executed in hardware. In yet another embodiment, the multiplexer module 48 is executed in a combination of software and hardware. As would be apparent to one of ordinary skill in the art, the multiplexer module 48 can be executed by any combination of software and hardware.

In an embodiment, the multiplexer module 48 employs an allocation algorithm. For any given time slot, the allocation algorithm eliminates TFCs that need to be padded. Thus, only TFCs that do not need padding are valid. For a given time slot, TFCs needing padding are invalid.

If the allocation algorithm did not eliminate invalid TFCs, the allocation algorithm could select a TFC requiring padding. Selecting a TFC that allows the transmission of the most high priority bits may result in an invalid TFC being selected.

The TFC could be invalid because the TFC selected results in high priority bits being transmitted, but there are bits available within the TFC for other lower priority logical channels. In order to avoid an invalid TFC being selected, it is necessary for the allocation algorithm of an embodiment to eliminate invalid TFCs before selecting a TFC.

A set of allowable TFCs is received from the network. The set is called the transport frame combination set (TFCS). The TFCs in the TFCS are allowable in the sense that the network allows the TFCs to be transported through the network.

In one embodiment, the allocation algorithm has at least three steps as shown below:
(1) Set S1 to the set of TFCs in the TFCS that can be used based on the current maximum transmitter power;
(2) Set S2 to the set of TFCs in S1 that can be used based on the current bit availability from the different logical channels given that introducing "padding" blocks is not allowed; and
(3) Pick the TFC from S2 that allows the transmission of the most high priority bits.

In another embodiment, steps (1) and (2) are reversed. Another embodiment includes steps (2) and (3), but not step (1). Each one of the steps is described in more detail below.

In step (1), TFCs are eliminated from the set of allowable TFCs based on power requirements. Each TFC requires a certain amount of power in order to be transmitted. The power requirement for each TFC is computed. The TFCs that require more power than can be currently transmitted are eliminated. The TFCs that do not require more power than can be currently transmitted remain.

The second step is the elimination of remaining TFCs that require padding blocks based on available bits. The TFCs having available bits are eliminated. Each TFC is checked for empty blocks.

$BS_{ij}$ is the block size and $BSS_{ij}$ is the block set size in the ith TFC (of the allowable TFCs) for the jth transport channel. Let $B_{ik}$ be the buffer occupancy for the kth logical channel corresponding to the ith transport channel. It is assumed that the block size and block set size are adjusted for the MAC header and that therefore there is a strict correspondence with the buffer occupancy. A TFC is acceptable only if it cannot contain more bits than are available for any of the transport channels. The remaining pseudo-code for the elimination of TFCs based on available bits is shown below:

1. Set S2 = S1.
2. Let there be n transport channels numbered from 1 through n.
3. Set i = 1. This will be the index for all transport channels.
4. Let Sb be the set of block sizes that exist in any TFC in S2 for the $i^{th}$ transport channel.
5. Pick a block size BS from Sb.
6. Let St be the set of m TFCs in S2, numbered 1 through m, that have block size BS for the $i^{th}$ transport channel.
7. Set j = 1. This will be the index for the TFCs in St.
8. Compute: $T = BS \cdot \sum_{k} \lceil \frac{B_{ik}}{BS} \rceil$.
9. If $BSS_{ji} \leq T$ then go to 11. Where $BSS_{ji}$ corresponds to the $i^{th}$ trasport channel for the $j^{th}$ TFC in St.
10. S2 = S2 − {TFCj}. Where TFCj is the $j^{th}$ TFC in St.
11. j += 1.
12. If j ≤ m then go to step 9.
13. Set Sb = Sb −{BS}.
14. If Sb ≠ {Ø} then go to step 5.
15. Set i += 1.
16. If i ≤ n then go to step 4.
17. The algorithm is complete and the valid TFCs are in S2.

Figure 3A:
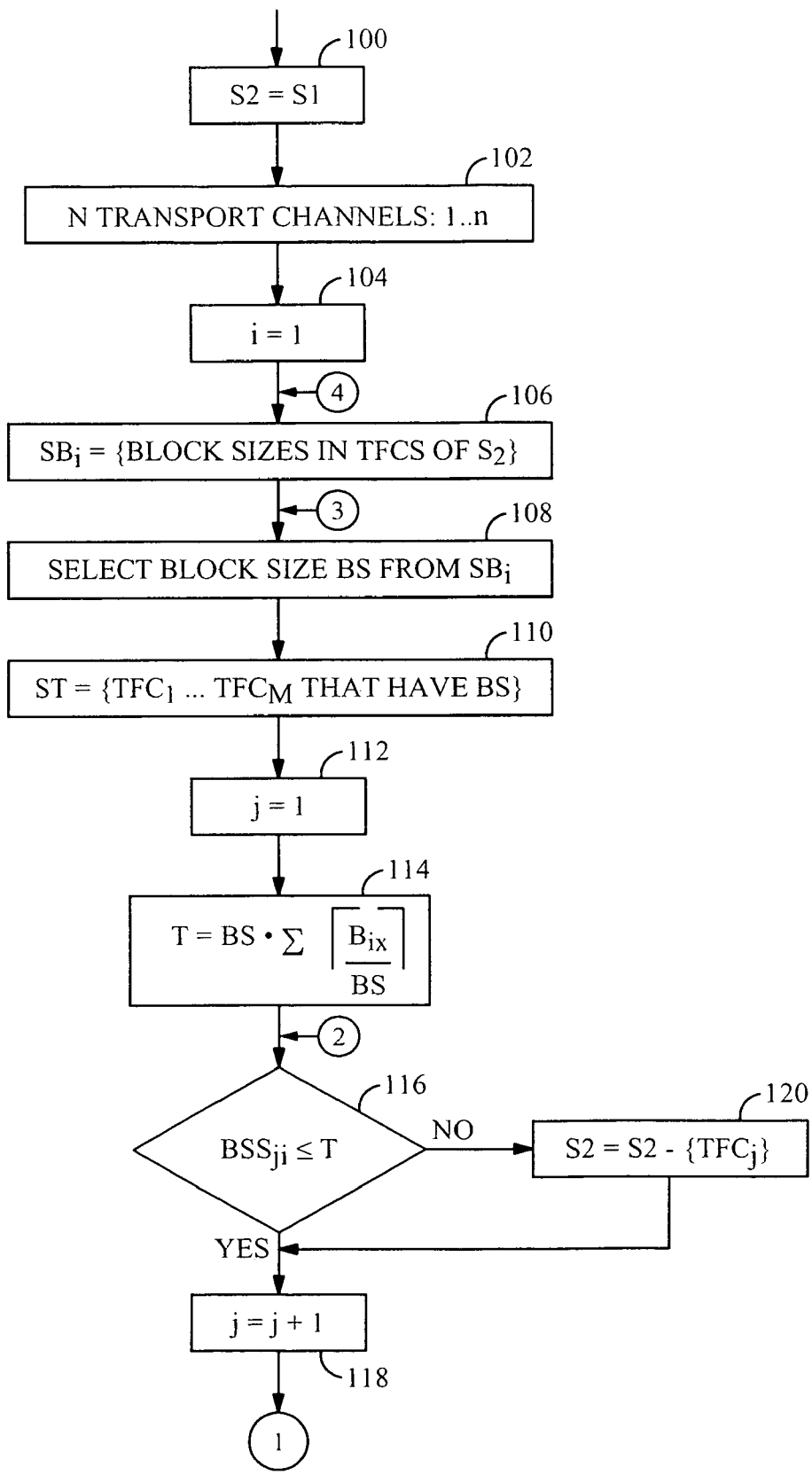
FIGS. 3A-3B show a flowchart for the elimination of TFCs based on available bits in an embodiment.
Figure 3B:
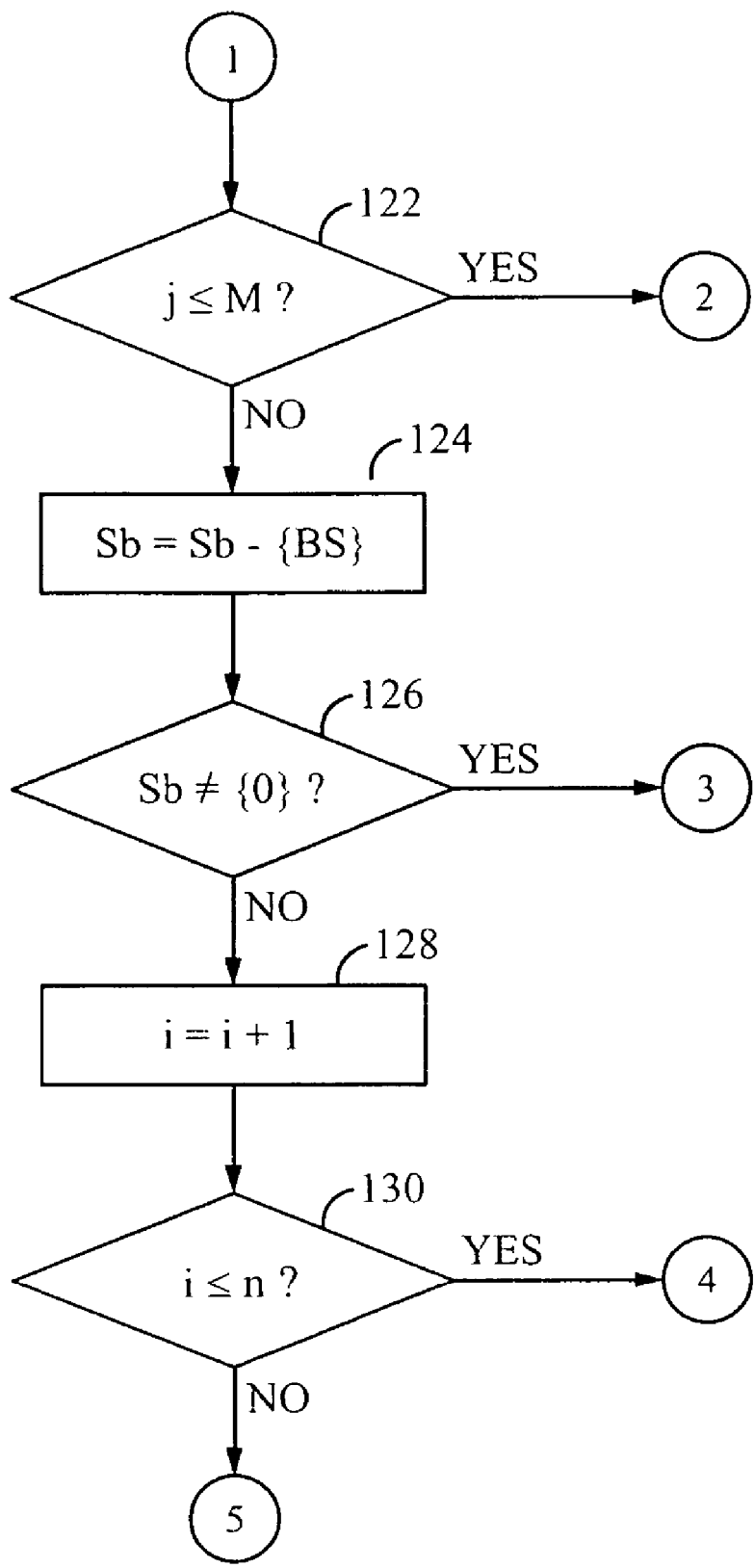

FIGS. 3A-3B show a flowchart in one embodiment for the elimination of TFCs based on available bits. Set S2 is set to S1 100. S1 is the set of allowable TFCs that do not require more power than can be transmitted. Let there be n transport channels numbered from 1 through n 102. Initialize index i 104. Index i is the index for the transport channels. Let Sb be the set of all block sizes that exist in any TFC in set S2 for the ith transport channel 106. Select block size BS from set Sb 108. Let St be the set of m TFCs in set S2, numbered 1 through m, that have block size BS for the ith transport channel 110. Initialize index j 112. Index j is the index for the TFCs in set St.

Compute a threshold $$T = BS \cdot \sum_k \left\lceil \frac{B_{ik}}{BS} \right\rceil \ 114.$$

Threshold T is used to check whether there is too much space in a TFC. If the Block Set Size $BSS_{ji} \leq T$ 116, then index j is incremented 118, otherwise there is too much space such that the TFC would require padding blocks and the TFCj is removed from set S2 120 and index j is incremented 118. If there are more TFCs to process, i.e., $j \leq m$ then go back and check if the Block Set Size $BSS_{ji} \leq T$ 116, otherwise subtract the entry with this block size from set Sb by the block size 124. If Sb is non-null, then go back and select another block size BS 108, otherwise increment index i 128. If all the transport channels have not been processed, i.e., $i \leq n$ 130, then Let Sb be the set of all block sizes that exist in any TFC in set S2 for the next transport channel 106. If i>n, then all invalid TFCs have been removed from set of available TFC that do not require more power than can be transmitted. The valid TFCs are in set S2.

In one embodiment, all of the TFCs with the same block size (on the ith transport channel) are grouped in S2. In another embodiment, TFCs with the same block size do not have to be grouped together. In this embodiment, T is computed every time a different TFC is examined.

The third step is the selection of the optimum TFC. Bits from the logical data streams are hypothetically loaded into the TFC. The loaded TFCs are compared based on the amount of high priority data they contain.

There are n priority levels, P1 through Pn with P1 being the highest priority. Let there be q TFCs in S2, numbered from 1 to q. For each TFC in S2, create a variable NOB (number of bits) and for each one of the transport channels on each TFC, create a variable SAS (still available space). All SAS shall be initialized to the corresponding TFC block set size. NOBi and SASij are the variables for the ith TFC in S2 and the jth transport channel. Lij is the jth logical channel at priority level Pi. Then the following algorithm can be performed:

1. Set S3 = S2.
2. Set i = 1. This is going to be the index for the priority levels.
3. Initialize the NOBs for all TFCs in S3 to 0.
4. Let m be the number of logical channels of priority Pi.
5. Set j = 1. This is going to be the index for the logical channels at the current priority level.
6. Let Bij be the number of available bits for logical channel Lij.
7. Let l be the transport channel on which logical channel j is mapped.
8. Set k = 1. This will be the index of TFCs in S3.
9. If $\left\lceil \frac{B_{ij}}{BS} \right\rceil \cdot BS < SAS_{kl}$ then go to step 13.
10. $NOB_k \mathrel{+}= SAS_{kl}$.
11. $SAS_{kl} = 0$.
12. Go to step 15.
13. $NOB_k \mathrel{+}= \left\lceil \frac{B_{ij}}{BS} \right\rceil \cdot BS$. (It is also possible to do: $NOB_k \mathrel{+}= B_{ij}$. But this makes the outcome order dependent.).
14. $SAS_{kl} \mathrel{-}= \left\lceil \frac{B_{ij}}{BS} \right\rceil \cdot BS$.
15. k += 1.
16. If $k \leq q$ then go to step 9.
17. j += 1 ; Logical Channels
18. If $j \leq m$ then go to step 6.
19. Keep in S3 the TFCs for which the NOB is the highest.
20. If there is no TFC in S3, then go to the next time slot.
21. If there is a single TFC in S3 then the algorithm is complete. The single TFC is used. Go to the next time slot.
22. i += 1.; Priority
23. If $i \leq n$ then go to step 3.
24. Pick arbitrarily one of the TFCs in S3. Go to the next time slot.

Figure 4A:
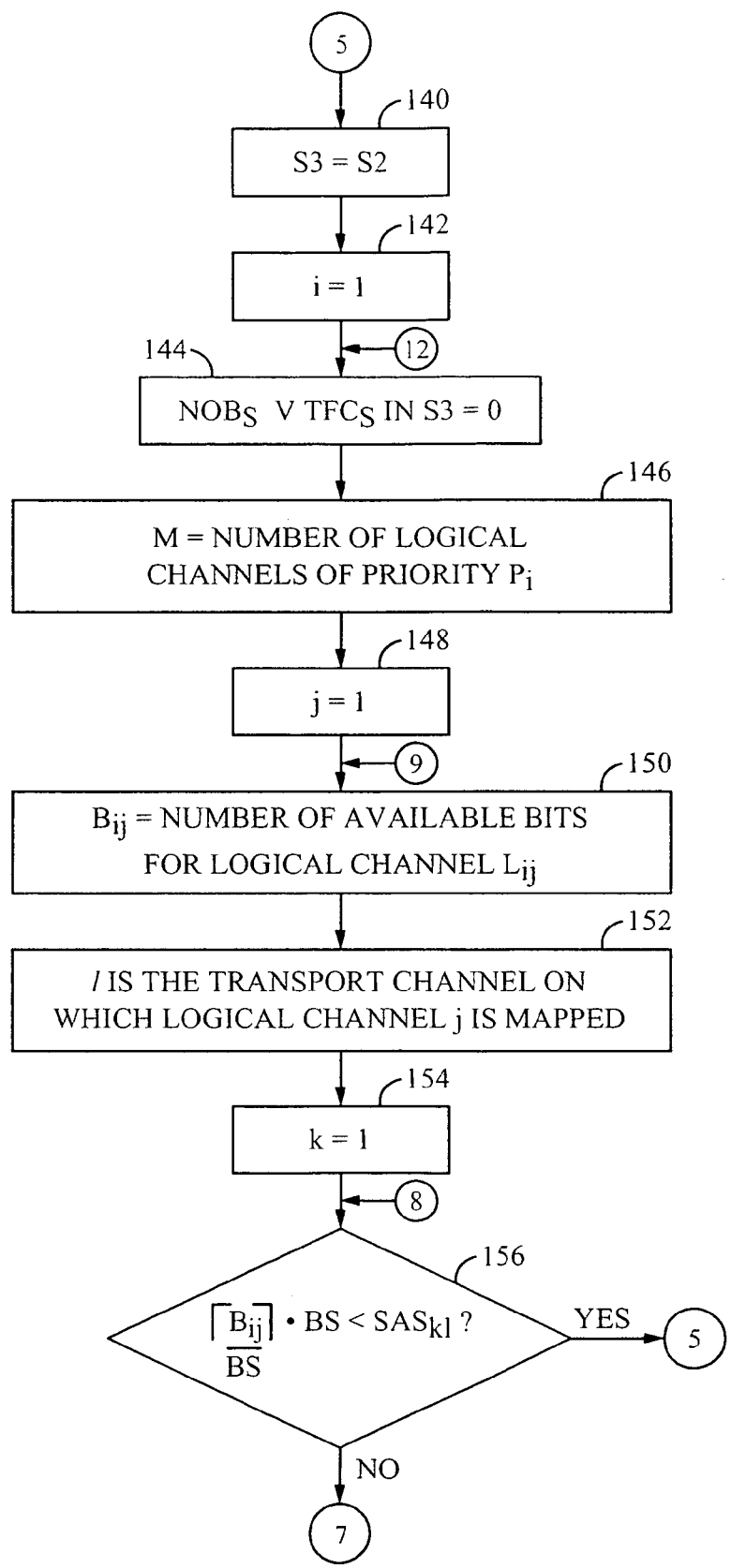
FIGS. 4A-4C show a flowchart for selecting a TFC in an exemplary embodiment.
Figure 4B:
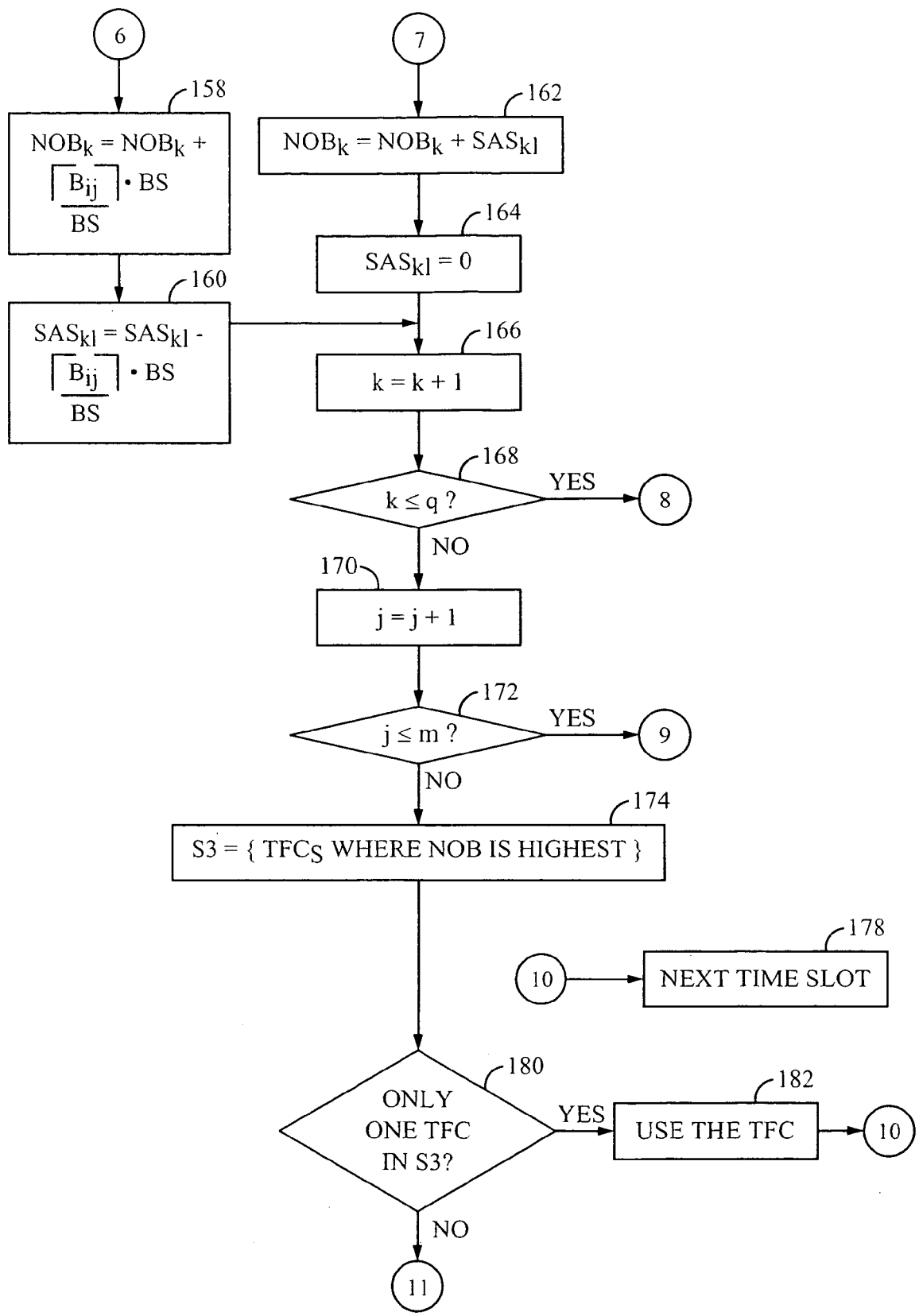
Figure 4C:
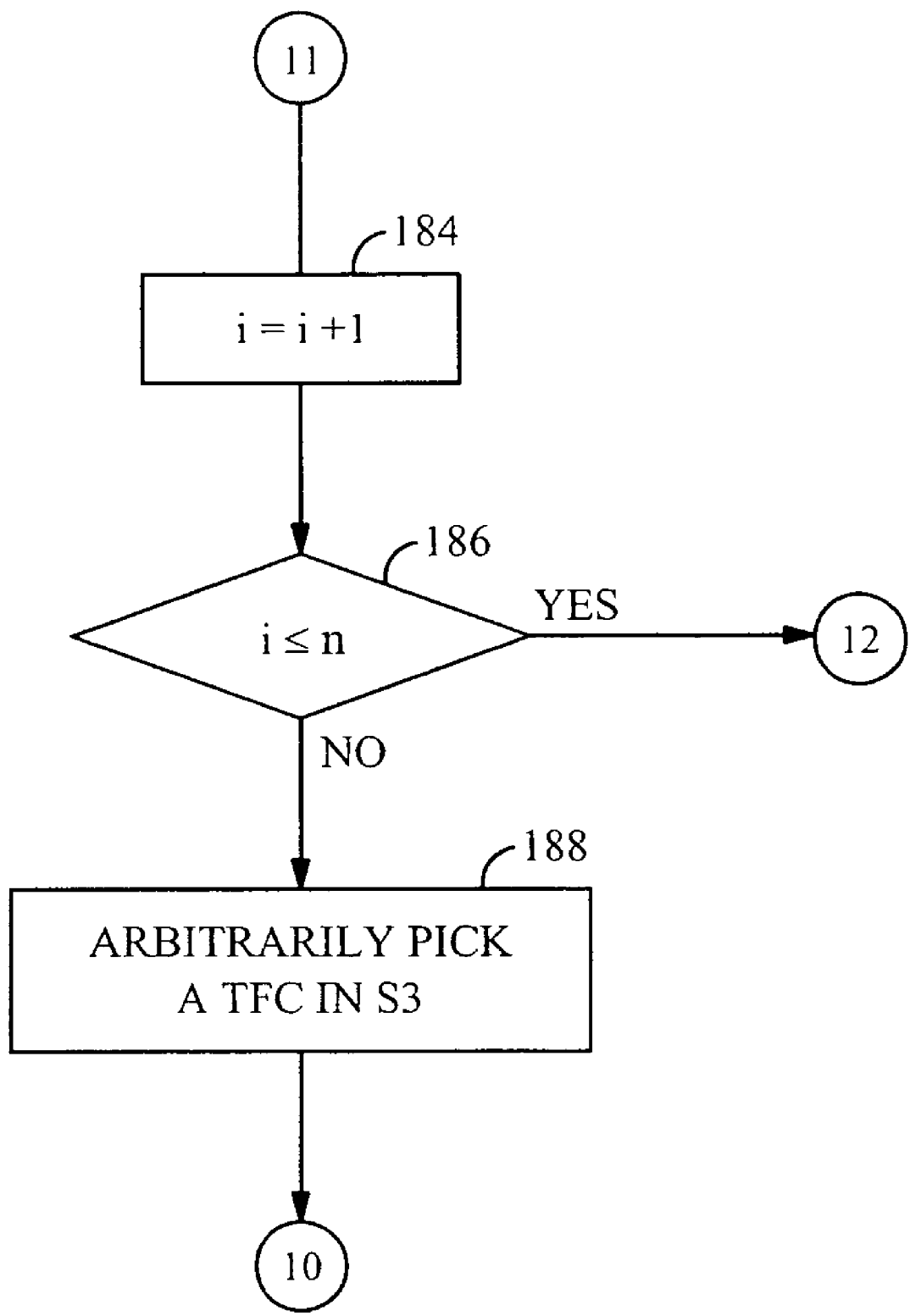

FIGS. 4A-4C show a flowchart for selecting a TFC in an exemplary embodiment. Set S3 is set to set S2 140, which is the set of valid TFCs. Set S3 shall provide a set of TFCs that can be selected for transport. The index for the priority levels, index i is initialized 142. There is an NOB variable for all TFCs in set S3. NOB stands for number of bits. The NOB variables for all TFCs in S3 are initialized to zero 144. Let m be the number of logical channels of priority PI 146. The index for the logical channels at the current priority level, index j, is initialized to one 148. Let Bij be the number of available bits for logical channel Lij 150. Logical channels are mapped to transport channels. I is the transport channel on which logical channel j is mapped 152. Initialize the index of the TFCs in set S3, k, to one.

If there is still available space after filling Bij, i.e., $$\left\lceil \frac{B_{ij}}{BS} \right\rceil \cdot BS < SAS_{kl} \ 156,$$

then increment NOBk by $$\left\lceil \frac{B_{ij}}{BS} \right\rceil \cdot BS_{kl} \ 158$$

and subtract $$\left\lceil \frac{B_{ij}}{BS} \right\rceil \cdot BS_{kl} \text{ from } SAS_{kl} \ 160.$$

Then, increment index k 166. If there is no available space after filling Bij, then increment the number of bits NOBk by SASkl 162 and reset SASkl to zero 164. Increment index k 166. If the TFCs in S2 have not been processed for this logical channel, i.e, if $k \leq q$ 168, then go back to fill more TFCs, i.e., $$\left\lceil \frac{B_{ij}}{BS} \right\rceil \cdot BS < SAS_{kl} \ 156.$$

If the TFCs in S2 have been processed for this logical channel, then increment index j 170. If index $j \leq m$ then go back and let Bij be the number of available bits for logical channel Lij 50. Otherwise put the TFCs for which the NOB is the highest in set S3 174. If there is a single TFC in S3 180, then the single TFC is used 182. Go to the next time slot 178. If there is more than one TFC in S3, then increment index i 184. If i≦n 186, then go back and initialize the NOB variables for all TFCs in S3 to zero 144 and continue the algorithm. Otherwise, all transport channels have been processed. One of the TFCs in S3 can be arbitrarily chosen for transmission 188. Go to the next time slot 178.

As would be apparent to one of ordinary skill in the art, the TFC algorithm can be applied to other interconnections between network modules. It can be applied to any situation where a module has a plurality of inputs and produces a multiplexed ouput from the plurality of inputs. For example, a multiplexer module can be located within a BTS wherein the BTS multiplexes data streams from a plurality of mobile stations and produces a multiplexed data stream to be sent to the BSC.

Thus, a novel and improved method and apparatus for multiplexing multiple data streams onto one data stream have been described. Those of skill in the art would understand that the various illustrative logical blocks, modules, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and algorithm steps described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The multiplexer may advantageously be a microprocessor, but in the alternative, the multiplexer may be any conventional processor, controller, microcontroller, or state machine. The applications could reside in RAM memory, flash memory, ROM memory, EPROM memory, EEPROM memory, registers, hard disk, a removable disk, a CD-ROM, or any other form of storage medium known in the art. As illustrated in FIG. 2, a base station 14 is advantageously coupled to a mobile station 12 so as to read information from the base station 14. The memory 49 may be integral to the multiplexer 48. The multiplexer 48 and memory 49 may reside in an ASIC (not shown). The ASIC may reside in a telephone 12.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method, comprising:
receiving a set of transport frame combinations (TFCs); and
selecting a TFC from the received set based on whether at least one TFC in the received set can be filled with bits from a plurality of data streams;
filling the selected TFC with bits from the plurality of data streams; and
comparing the selected TFC with other TFCs from the set of TFCs.

2. The method of claim 1, further comprising scheduling the selected TFC for transport.

3. The method of claim 1, further comprising allocating the TFC to a single transport stream.

4. The method of claim 1, wherein the selecting a TFC is also based on the priority of the plurality of data streams.

5. The method of claim 1, wherein the selected TFC includes more bits from the highest priority data stream than other TFCs in the set of TFCs.

6. The method of claim 1, wherein the selected TFC includes more high priority bits from the plurality of data streams as compared to other TFCs in the set of TFCs.

7. A subscriber unit, comprising:
a memory;
a multiplexer for receiving a set of transport frame combinations (TFCs) and selecting a TFC from the received set based on whether at least one TFC in the received set can be filled with bits from a plurality of data streams;
wherein the multiplexer fills the selected TFC with bits from the plurality of data streams and compares the selected TFC with other TFCs from the set of TFCs.

8. The subscriber unit of claim 7, wherein the multiplexer is configured to schedule the selected TFC for transport.

9. The subscriber unit of claim 7, wherein the multiplexer is configured to allocate the TFC to a single transport stream.

10. The subscriber unit of claim 7, wherein the multiplexer is configured to select the TFC based on the priority of data streams.

11. The subscriber unit of claim 7, wherein the multiplexer is configured to select the TFC that includes more bits from the highest priority data stream of the plurality of data streams than other TFC in the set of TFCs.

12. The subscriber unit of claim 7, wherein the multiplexer is configured to select the TFC that includes more high priority bits from the plurality of data streams as compared to other TFCs in the set of TFCs.

* * * * *